US012792609B2

(12) United States Patent
He

(10) Patent No.: US 12,792,609 B2
(45) Date of Patent: Nov. 10, 2026

(54) MECHANISM TO ACCELERATE SECURITY ANALYSIS THROUGH OS-OPTIMIZED QUERIES WITHIN OPERATING SYSTEMS

(71) Applicant: Bytedance Technology Ltd., Grand Cayman (KY)

(72) Inventor: Kenney He, Wilmington, DE (US)

(73) Assignee: BYTEDANCE TECHNOLOGY LTD., Grand Cayman (KY)

( * ) Notice: Subject to any disclaimer, the term of this patent is extended or adjusted under 35 U.S.C. 154(b) by 0 days.

(21) Appl. No.: 19/197,932

(22) Filed: May 2, 2025

(65) Prior Publication Data

US 2026/0350013 A1 Nov. 5, 2026

(51) Int. Cl.

| | |
|---|---|
| ***G06F 16/2455*** | (2019.01) |
| ***G06F 11/34*** | (2006.01) |
| ***G06F 16/248*** | (2019.01) |
| ***G06F 16/25*** | (2019.01) |

(52) U.S. Cl.

CPC .... *G06F 16/24556* (2019.01); *G06F 11/3409* (2013.01); *G06F 16/248* (2019.01); *G06F 16/256* (2019.01); *G06F 2201/80* (2013.01)

(58) Field of Classification Search

None

See application file for complete search history.

(56) References Cited

U.S. PATENT DOCUMENTS

| | | | | |
|---|---|---|---|---|
| 2016/0034553 | A1* | 2/2016 | Tong | G06F 16/248 707/754 |
| 2016/0267105 | A1* | 9/2016 | Sun | G06F 16/128 |
| 2025/0371003 | A1* | 12/2025 | Stolze | G06F 16/24542 |

* cited by examiner

*Primary Examiner* — Eddy Cheung

(74) *Attorney, Agent, or Firm* — Astute IP Law Group

(57) ABSTRACT

Embodiments of the present disclosure provide a solution for investigating an operating system of a computer. The method includes: partitioning a target set of data into a plurality of subsets based on a portion of an operating system level attribute in the target set of data; querying a virtual database of the operating system for each of the subsets; querying the virtual database for a complement of the plurality of subsets; and outputting aggregated query results to a virtual table or log.

20 Claims, 6 Drawing Sheets

MECHANISM TO ACCELERATE SECURITY ANALYSIS THROUGH OS-OPTIMIZED QUERIES WITHIN OPERATING SYSTEMS

FIELD

Embodiments of the present disclosure relates generally to cybersecurity, and more particularly, to queries within operating systems.

BACKGROUND

Cybersecurity solutions for malware detection, forensic investigation, and mitigation rely on signature-based query methods, often conducted hourly or daily. This schedule may have drawbacks in terms of both vulnerability and resource usage. For instance, the schedule may create a vulnerability window during which newly emerging malware and new malicious actors may compromise host operating systems (OSs). Furthermore, the volume of these queries, compounded by network congestion, can lead to significant performance bottlenecks due to their impact on memory and central processing unit (CPU) computation. For example, known performance bottlenecks can be referred to as a thundering herd or thrashing effect. As the volume of host data and network traffic escalates, more efficient and responsive method for malware and user threat management that provide comprehensive host protection against evolving threats are desirable.

SUMMARY

Embodiments of the present disclosure provide a solution for investigating an operating system of a computer. For instance, the operating system may be investigated to perform cybersecurity analysis such as forensic investigation or malware detection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some aspects, the techniques described herein relate to a computer-implemented method of investigating an operating system of a computer, including: partitioning a target set of data into a plurality of subsets based on a portion of an operating system level attribute in the target set of data; querying a virtual database of the operating system for each of the subsets; querying the virtual database for a complement of the plurality of subsets; and outputting aggregated query results to a virtual table or log.

In some aspects, the techniques described herein relate to a computer-implemented method, wherein the operating system level attribute includes one or more of a user identifier, a process name, an internet protocol address, a socket number, or a time.

In some aspects, the techniques described herein relate to a computer-implemented method, further including evaluating whether to query the virtual database with a proposed query and proposed partition size using a model trained to predict a performance metric of the computer.

In some aspects, the techniques described herein relate to a computer-implemented method, further including deploying a script to execute the querying based on the plurality of subsets to one or more other hosts when the model predicts an acceptable performance metric for the one or more other hosts.

In some aspects, the techniques described herein relate to a computer-implemented method, further including increasing a quantity of the plurality of subsets in response to the predicted performance metric being unacceptable.

In some aspects, the techniques described herein relate to a computer-implemented method, wherein partitioning the target set of data into a plurality of subsets based on a portion of an operating system level attribute in the target set of data includes tagging each of the plurality of subsets with a respective tag based on a range of a prefix of the operating system level attribute.

In some aspects, the techniques described herein relate to a computer-implemented method, wherein querying a virtual database of the operating system for each of the subsets includes: selecting rows including the tagged operating system level attribute from two or more tables of the virtual database; and joining the selected rows in a table corresponding to the tag.

In some aspects, the techniques described herein relate to a computer-implemented method, wherein outputting aggregated query results to a virtual table or log includes performing a union on each of the tables corresponding to the tags.

In some aspects, the techniques described herein relate to a computer-implemented method, further including generating a cryptographic fingerprint of the table corresponding to the tag.

In some aspects, the techniques described herein relate to a computer-implemented method, further including: scanning the virtual table or log for a known malware fingerprint; or analyzing the virtual table or log to detect a zero-day malware.

In some aspects, the techniques described herein relate to a computer-implemented method to detect bottlenecks in one or more hosts, the computer-implemented method including: querying a virtual database of each host, using a plurality of worker threads to access respective tags assigned to each host, wherein each host has been tagged based on one or more features specific to each host; processing, using the plurality of worker threads for queries, results of said queries in accordance with a decision-tree based logic that accords weights to a plurality of factors.

In some aspects, the techniques described herein relate to a computer-implemented method, wherein each host is initially assigned one or more tags, and wherein each host can have an increased number of tags after initial assignment of the one or more tags.

In some aspects, the techniques described herein relate to a computer-implemented method, further including: responsive to changes in a workload for said querying and processing, adding one more worker thread to the plurality of worker threads, or removing one worker thread from the plurality of worker threads.

In some aspects, the techniques described herein relate to a computer-implemented method, further including: shuffling the plurality of worker threads when querying a large virtual table of the virtual database and processing the results thereof after the querying has started.

In some aspects, the techniques described herein relate to a computer-implemented method, further including: responsive to determining a missing query, performing one of: dispatching the missing query, prioritizing the missing query ahead of an original schedule, or delaying the missing query after the original schedule.

In some aspects, the techniques described herein relate to a computer-implemented method, further including: responsive to determining one or more nonconforming table entries, performing one of: dispatching an inverted relational query, prioritizing the inverted relational query ahead of an original schedule, or delaying the inverted relational query after the original schedule.

In some aspects, the techniques described herein relate to an apparatus for investigating an operating system of a computer including a processor and a non-transitory memory with instructions thereon, wherein the instructions upon execution by the processor, cause the processor to: partition a target set of data into a plurality of subsets based on a portion of an operating system level attribute in the target set of data; query a virtual database of the operating system for each of the subsets; query the virtual database for a complement of the plurality of subsets; and output aggregated query results to a virtual table or log.

In some aspects, the techniques described herein relate to a non-transitory computer-readable storage medium storing instructions that cause a processor to: partition a target set of data into a plurality of subsets based on a portion of an operating system level attribute in the target set of data; query a virtual database of the operating system for each of the subsets; query the virtual database for a complement of the plurality of subsets; and output aggregated query results to a virtual table or log.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

EXAMPLE ENVIRONMENT

Figure 1:
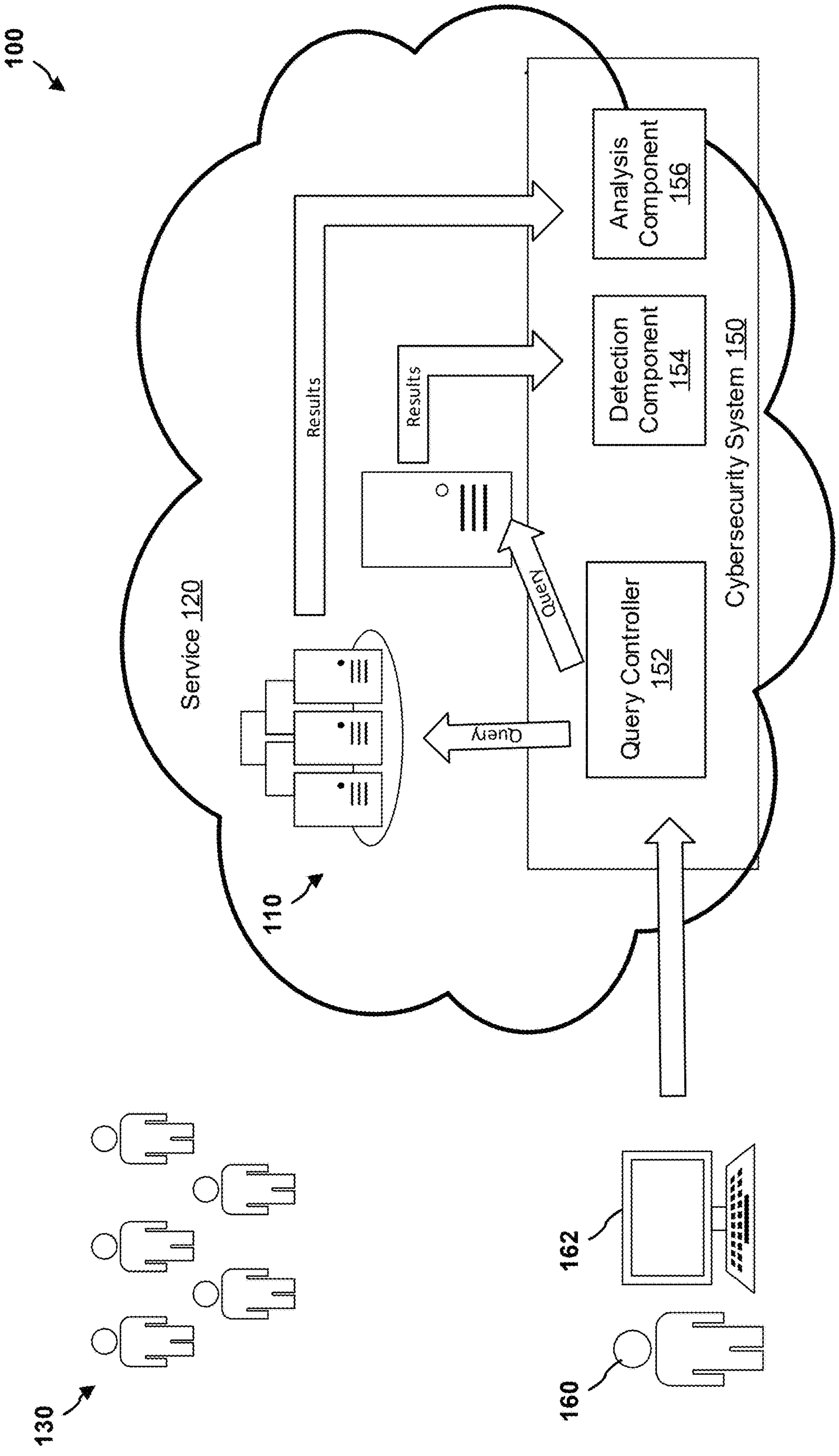
FIG. 1 is a block diagram that illustrates an example environment for providing cybersecurity of hosts, in accordance with some embodiments of the present disclosure.

FIG. 1 is a block diagram that illustrates an example environment 100 for providing cybersecurity of hosts 110. The hosts 110 may provide a service 120 to users 130. For instance, the hosts 110 can include datacenters and/or servers that provide the service 120 by responding to requests from users 130. The service 120 may include any service provided via a network. Example services may include a website, audio or video streaming, an e-commerce site, a gaming platform, or a financial service.

The hosts 110 and service 120 may potentially be attacked by malware or other exploits. For instance, malware may attempt to gain access to data within the service 120 or may attempt to impede access to the service by users 130. A cybersecurity analyst 160 may utilize a terminal 162 to investigate the hosts 110. As noted above, a conventional approach to cybersecurity is to periodically scan the hosts 110 for signatures of malware (i.e., known sequences that are present in the malware across different systems). Forensic analysis may similarly involve scanning the hosts 110 to collect data to be analyzed for patterns. One technique to scan a computer host is virtualization of an operating system as a virtual database. Generally, an operating system provides low level commands that can be used to access operating system level attributes such as user identifiers, process names, internet protocol (IP) addresses, socket numbers, time stamps, etc. Virtualization allows the use of database queries (e.g., using structured query language (SQL)) to collect and organize operating system level attributes into tables. While virtualization of an operating system as a virtual database is convenient for analysts, queries can also be computationally intense for the hosts 110. Performing a query on a host 110 uses computing resources that may otherwise be used for providing the service 120. In particular, a query may involve JOIN operations over large sets of operating system data. These JOIN operations can consume significant computing resources, which may reduce the ability of a host 110 to provide a service. For instance, users 130 may notice an interruption of service 120 when a query is being performed.

Additionally, malware and malicious actors increasingly circumvent detection methods using non-alphanumeric characters and obfuscation techniques. In the context of a query, such techniques may prevent some records associated with the malware or malicious actors from being matched with query terms, thereby avoiding detection of the malware or malicious actor.

In an aspect, the present disclosure provides a cybersecurity system 150 that includes a query controller 152 for accelerating security analysis using OS-optimized queries. The cybersecurity system 150 can be controlled by the cybersecurity analyst via the terminal 162. The query controller 152 deploys an algorithm to partition a target set of operating system data into a plurality of subsets based on a portion of an operating system level attribute in the target set of operating system data. By partitioning the target set, a query for each subset can be executed that is less computationally intensive than a query over the full data set. The queries can be executed in series to conserve computing resources, or in parallel to produce faster results. Strategic aggregation of subqueries produces complete results. The algorithm leverages a tagging system to partition data efficiently, minimizing resource demands, improving OS responsiveness, and reducing operational costs. Additionally, the risk of missed records can be mitigated by using inversion logic to query for records that do not match any of the subsets. Accordingly, the "cat-and-mouse" game of obfuscation can countered by employing inversion logic to identify all forms of vulnerabilities.

The output of the query results can be sent to a virtual table, a log, a security information and event management (SIEM) system, or to a security operations and automated response (SOAR) system. In some implementations, one or more hosts 110 may be secure, and the query results may not be egressed from the secure host. If network egress is not permissible, then the query results may be saved to a table for out of band transmission in an air gap environment. Alternatively a SIEM and/or a SOAR can be used to increase the effectiveness of handling fast response to a breach. The cybersecurity system 150 may include a detection component 154 configured to scanning the virtual table or log for a known malware fingerprint. The cybersecurity system 150 may include an analysis component 154 configured to analyze the virtual table or log to detect a zero-day malware. For instance, the detection component 154 and/or the analysis component 154 may be implemented at a SIEM system, a SOAR system, or locally on a host (e.g., where egress is not allowed).

Figure 2:
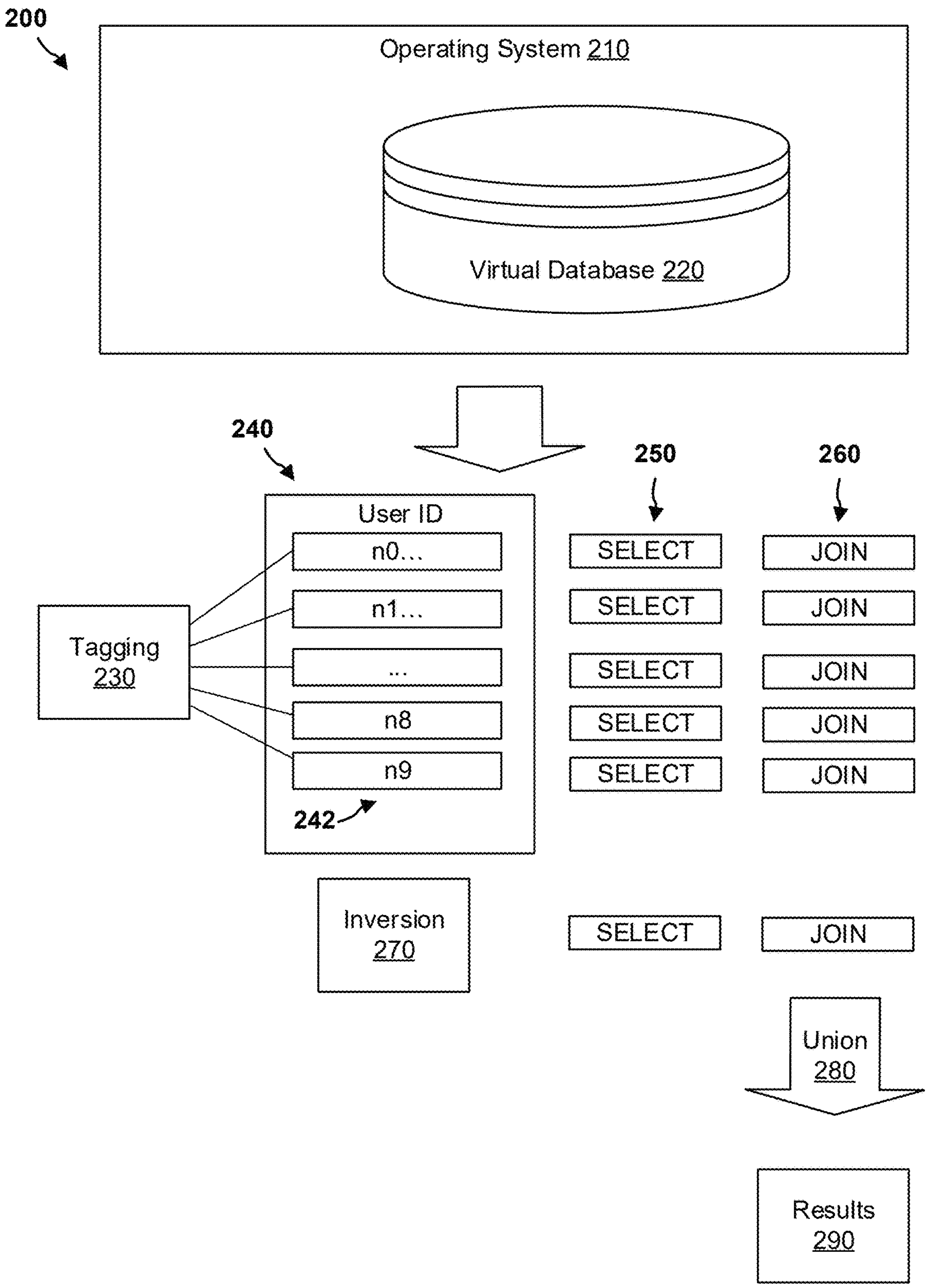
FIG. 2 is a block diagram that illustrates an example of data collection, in accordance with some embodiments of the present disclosure.

FIG. 2 is a block diagram 200 that illustrates an example of data collection using partitioning. A host 110 (FIG. 1) includes an operating system 210. The operating system 210 can be virtualized as a virtual database 220 to permit queries for operating system level attributes. The available attributes may vary based on the specific operating system. The attributes may include boot mode parameters, disk encryption information, power events, virtualized containers, forensic shell history events, network tables, software bill of materials, security events, virtual database processes, hardware information, or any other data that can be extracted using operating system commands and stored in a virtual database. Example operating system level attributes are listed in Appendix A.

A tagging operation 230 partitions data across one or more dimensions. For example, partitioning can be applied to a operating system level attribute 240 such as a User ID. The partitions may be systematically generated. For example, user IDs can partitioned based on the leading digit of the account ID. Using a notation where nX represents the subset of host data associated with account IDs beginning with digit X, the total set of user IDs (all1)) can be represented as:

$$\text{all1}_{tag} = \sum_{n=0}^{N=9} \text{host}_{tagn} = n0_{tag0} + n1_{tag1} + n2_{tag2} + n3_{tag3} + n4_{tag4} + n5_{tag5} + n6_{tag6} + n7_{tag7} + n8_{tag8} + n9_{tag9}$$

Additionally, the compliment of the set $\text{all1}_{tag}$ or the inverse may be represented as $!\text{all1}_{tag}$.

Therefore, $!\text{all1}_{tag}+\text{all1}_{tag}\forall V$.

As another example, a timestamp attribute may be partitioned based on a unit of time such as an hour.

$$\text{all1}_{tag} = \sum_{h=0}^{N=23} \text{host}_{tagn} = h0_{tag0} + h1_{tag1} + h2_{tag2} + h3_{tag3} + \ldots + h23_{tag23}$$

In an aspect, a query for each partitioned subset may be a SELECT operation 250 followed by a JOIN operation 260. In some implementations, a LIKE operator is used with the SELECT operation 250 to retrieve the rows matching the tagged attribute. For example, the following code may be used to obtain a table of listening ports associated with listening addresses, process names, and process identifiers:

```
SELECT DISTINCT process.name, listening.address, listening.port, process.pid FROM
JOIN listening_ports AS listening
ON process.pid=Iistening.pid
WHERE listening.address LIKE 'n1%'
```

An inversion operation 270 can generate a subset of data that is not included in any of the other tagged subsets. Similarly, SELECT operation 250 and JOIN operation 260 may be used to generate a similar table for the complement of the partitioned subsets. For instance, the NOT LIKE operator can be used to obtain the complement:

```
SELECT DISTINCT process.name, listening.address, listening.port, process.pid FROM
JOIN listening_ports AS listening
ON process.pid=Iistening.pid
WHERE listening.address NOT LIKE 'n1%'
```

Finally, a UNION operation 280 can be used to aggregate the results for each partitioned subset and the complement to produce final results 290. The final results 290 may include the same entries as a large JOIN across the entire data set without using as many resources. In some cases, the final results 290 may include entries captured by the complement that would not have been captured by other queries (e.g., due to non-standard characters or obfuscation).

Figure 3:
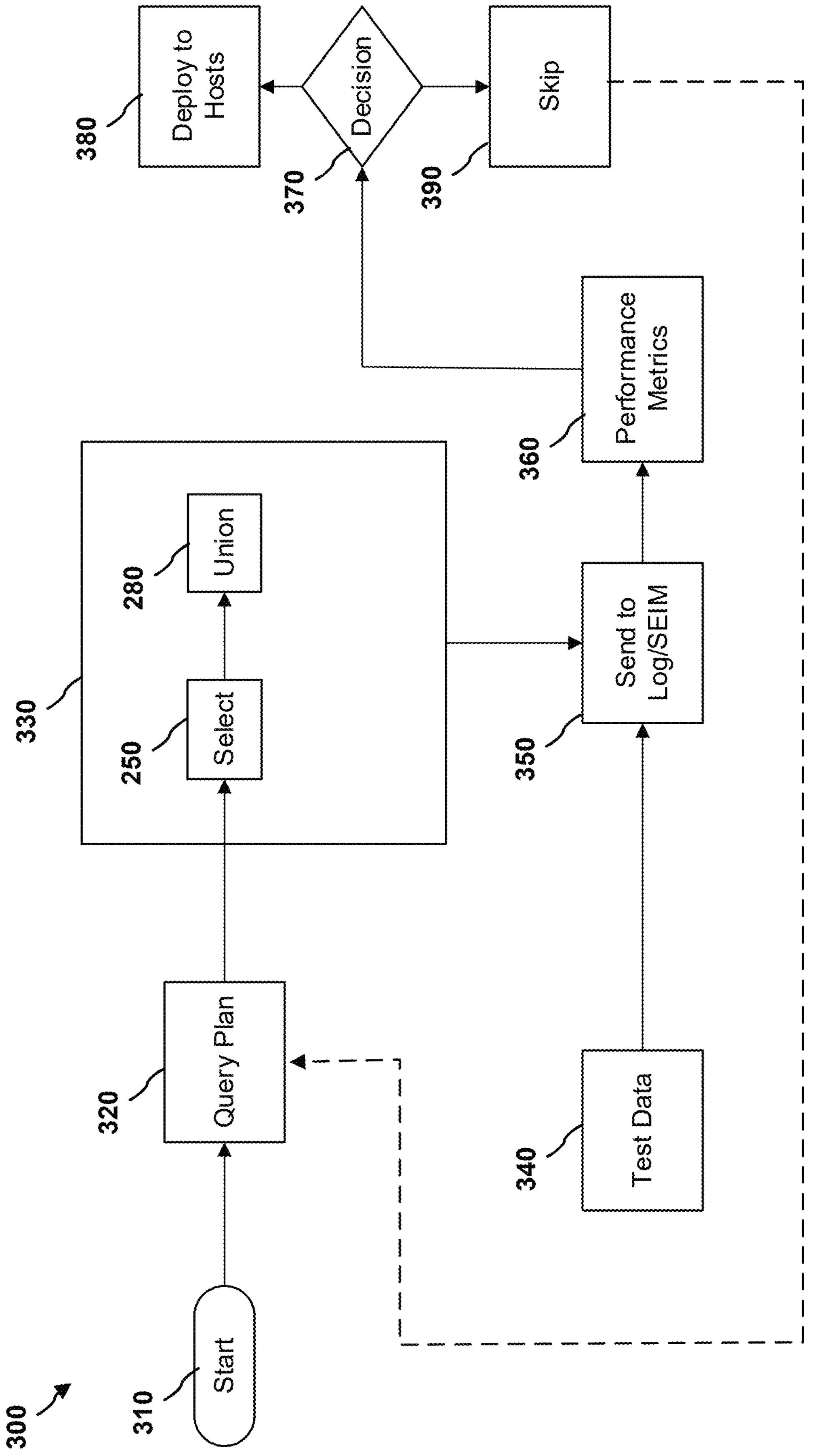
FIG. 3 is a flow diagram that illustrates an example method of evaluating a query plan, in accordance with some embodiments of the present disclosure.

FIG. 3 is a flow diagram that illustrates an example method 300 of evaluating a query plan using an AI decision tree. A query of an operating system has the potential to consume significant computing resources, which can impede a host 110 from providing the service 120. Although the use of partitioning can reduce the resource usage, it is still possible for a query to impact system performance. In another example scenario, when performing a forensic investigation on a host, it is important to minimize memory usage of the host to avoid destroying forensic evidence (e.g., contents of memory). In an aspect, an AI decision tree can be used to predict performance impacts prior to deploying a query. A query plan can be modified if deployment would have too great an impact on system performance.

The method 300 may start at block 310 and proceed to block 320, where a query plan is received. The query plan includes multiple partial virtual table queries. That is, the query plan may be generated using the techniques above to partition a data set. For instance, the query plan may include multiple SELECT operations 250 followed by UNION operations 280. At block 330, a test host may analyze the query plan. For example, the analysis at block 330 may include determining a number of query operations, determining a dataset or JOIN operation, or running the query on the test host. At block 340, test data from previous queries may be provided. At block 350, the results from the analysis in block 330 and the test data are sent to a log or SEIM. At block 360, the SEIM predicts performance metrics for the query. Using an AI model, the SEIM can predict resource usage for the query plan on different host configurations. At decision block 370 the SEIM can decide whether to deploy the query plan to one or more hosts based on the predicted performance metrics. For example, the SEIM may compare a predicted resource usage to an allowed resource usage level. At block 380, the query plan can be deployed to hosts if approved based on the predicted performance metrics. Alternatively, if the query plan is not approved, execution of the query plan is skipped in block 390. In some implementations, the query plan can be modified in response to a skip decision, and a revised query plan can be analyzed started in block 320. For instance, a number of partitions may be increased to reduce a size of a JOIN operation.

In some implementations, the decision block 370 may be further based on some identified scenarios where deploying a query may not be worthwhile. For instance, if the query plan indicates the same set of user IDs as a previous query, the query may be skipped even if low resource usage is predicted. As another example, a low priority query may be directed to a hostname that is not active (e.g., in a testing sandbox) or a host having a full file system. Alternatively, some high priority scenarios may be executed despite high predicted resource usage. For instance, a query may be executed if a host table is empty from a new installation, the query is directed to new user files, user created processes, and/or user network activities, or the query is a first scan for a host. In some implementations, the AI decision tree may implement further ML learning and training to re-rank query plans. For instance, actual performance and results metrics may be fed back to score or rank query plans for efficiency or effectiveness based on the predicted performance metrics.

Example Device

Figure 4:
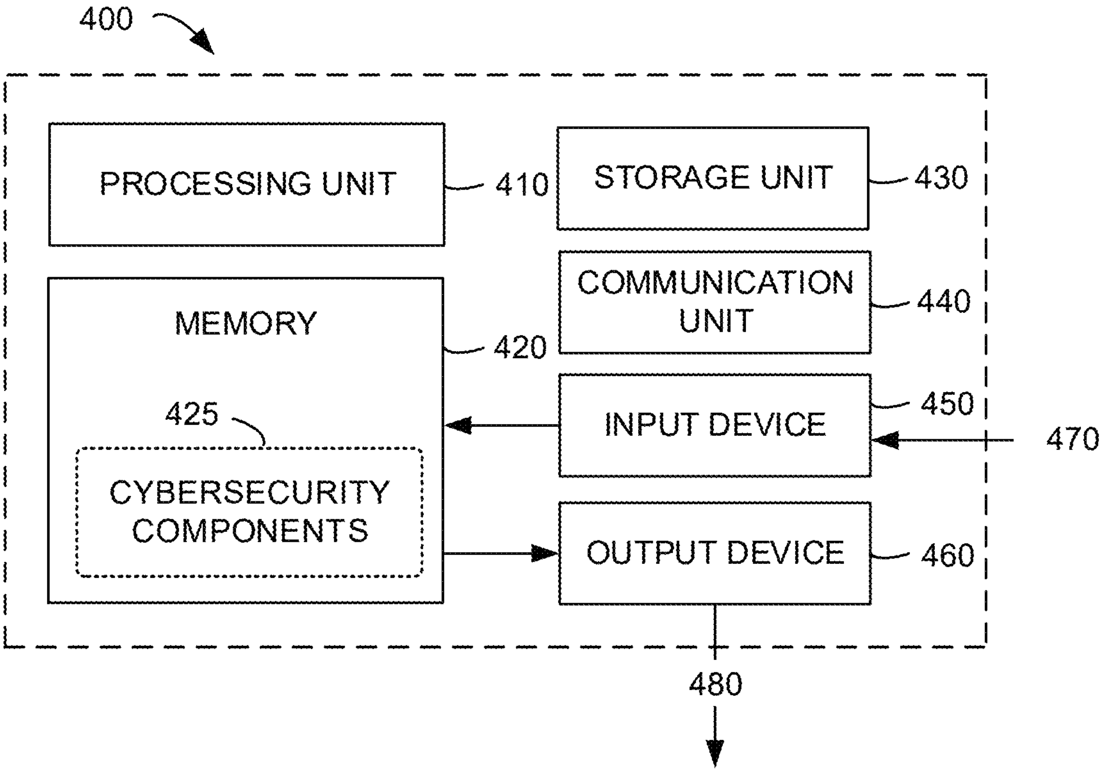
FIG. 4 illustrates a block diagram of a computing device in which various embodiments of the present disclosure can be implemented.

FIG. 4 illustrates a block diagram of a computing device 400 in which various embodiments of the present disclosure can be implemented. The computing device 400 may be implemented as or included in a host 110.

It would be appreciated that the computing device 400 shown in FIG. 4 is merely for purpose of illustration, without suggesting any limitation to the functions and scope of the embodiments of the present disclosure in any manner.

As shown in FIG. 4, the computing device 400 includes a general-purpose computing device 400. The computing device 400 may comprise one or more processors or processing units 410, a memory 420, a storage unit 430, one or more communication units 440, one or more input devices 450, and one or more output devices 460.

In some embodiments, the computing device 400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It is contemplated that the computing device 400 can support any type of interface to a user (such as "wearable" circuitry and the like).

The processing unit 410 may be a physical or virtual processor and can implement various processes based on programs stored in the memory 420. In a multi-processor system, multiple processing units execute computer executable instructions in parallel so as to improve the parallel processing capability of the computing device 400. The processing unit 410 may also be referred to as a central processing unit (CPU), a microprocessor, a controller or a microcontroller.

The computing device 400 typically includes various computer storage medium. Such medium can be any medium accessible by the computing device 400, including, but not limited to, volatile and non-volatile medium, or detachable and non-detachable medium. The memory 420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 430 may be any detachable or non-detachable medium and may include a machine-readable medium such as a memory, flash memory drive, magnetic disk or another other media, which can be used for storing information and/or visual data and can be accessed in the computing device 400.

The computing device 400 may further include additional detachable/non-detachable, volatile/non-volatile memory medium. Although not shown in FIG. 4, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more visual data medium interfaces.

The communication unit 440 communicates with a further computing device via the communication medium. In addition, the functions of the components in the computing device 400 can be implemented by a single computing cluster or multiple computing machines that can communicate via communication connections. Therefore, the computing device 400 can operate in a networked environment using a logical connection with one or more other servers, networked personal computers (PCs) or further general network nodes.

The input device 450 may be one or more of a variety of input devices, such as a mouse, keyboard, tracking ball, voice-input device, and the like. The input device 450 may receive input 470 from a user such as the cybersecurity analyst 160. The output device 460 may be one or more of a variety of output devices, such as a display, loudspeaker, printer, and the like. For instance, the output device 460 may present output 480 such as a display of the aggregated results. By means of the communication unit 440, the computing device 400 can further communicate with one or more external devices (not shown) such as the storage devices and display device, with one or more devices enabling the user to interact with the computing device 400, or any devices (such as a network card, a modem and the like) enabling the computing device 400 to communicate with one or more other computing devices, if required. Such communication can be performed via input/output (I/O) interfaces (not shown).

In some embodiments, instead of being integrated in a single device, some or all components of the computing device 400 may also be arranged in cloud computing architecture. In the cloud computing architecture, the components may be provided remotely and work together to implement the functionalities described in the present disclosure. In some embodiments, cloud computing provides computing, software, visual data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding visual data may be stored on a server at a remote position. The computing resources in the cloud computing environment may be merged or distributed at locations in a remote visual data center. Cloud computing infrastructures may provide the services through a shared visual data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 400 may be used to implement cybersecurity in embodiments of the present disclosure. The memory 420 may include one or more cybersecurity components 425 having one or more program instructions. For instance, the cybersecurity components 425 may implement the cybersecurity system 150 and include the query controller 152, the detection component 154, and the analysis component 156. These modules are accessible and executable by the processing unit 410 to perform the functionalities of the various embodiments described herein.

Example Methods

Figure 5:
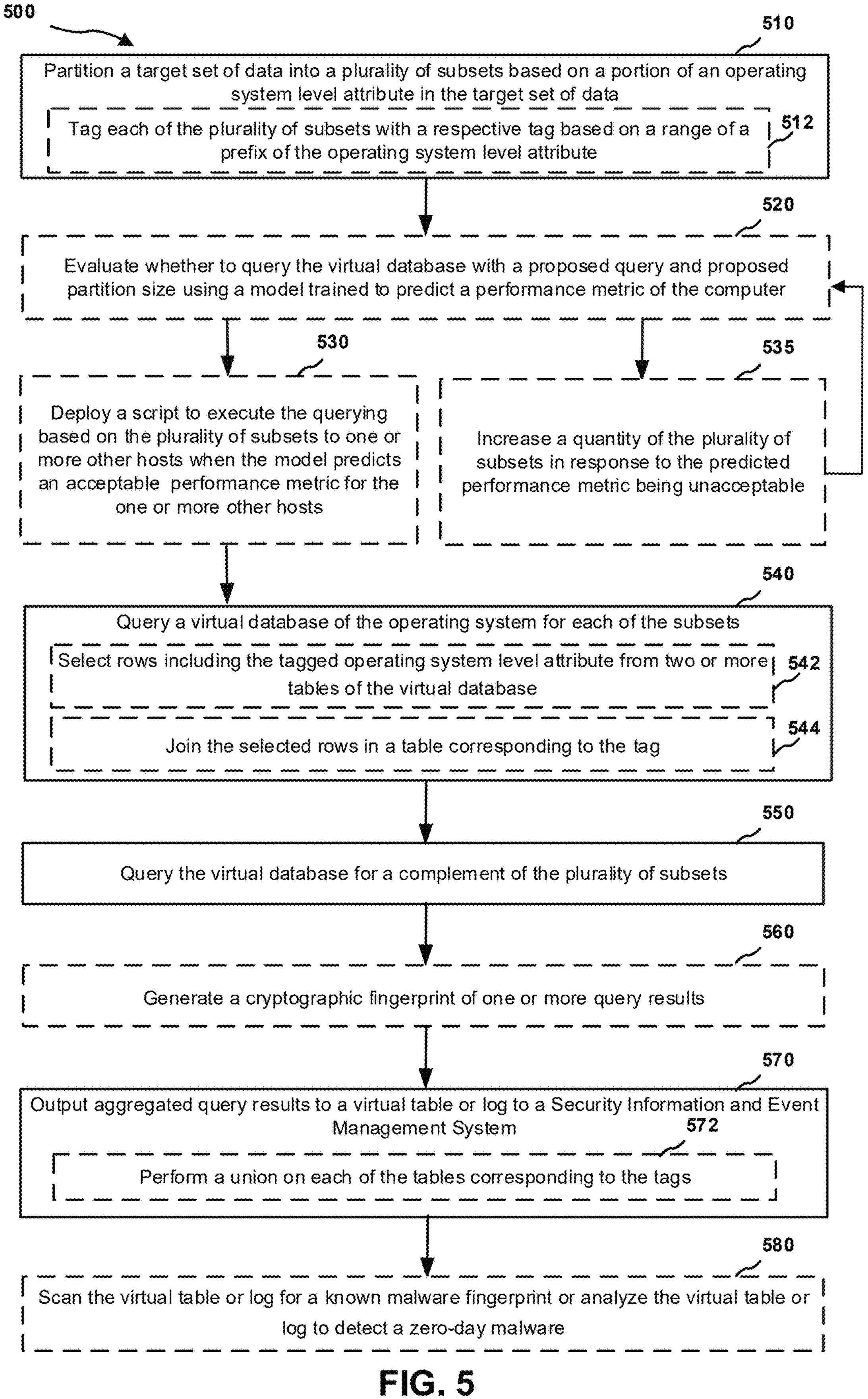
FIG. 5 is a flow diagram that illustrates an example method of collecting operating system data, in accordance with some embodiments of the present disclosure.

FIG. 5 is a flow diagram that illustrates an example method of collecting operating system data. The method 500 may be performed by the computing device 400 or one or more components thereof including the processing unit 410 executing the cybersecurity components 425. The method 500 may be performed in communication with one or more computers (e.g., hosts 110) having respective operating systems (e.g., operating system 210). Optional blocks are shown with dashed lines.

At block 510, the method 500 includes partitioning a target set of data into a plurality of subsets based on a portion of an operating system level attribute in the target set of data. In some implementations, for example, the processing unit 410 executing the cybersecurity components 425 partitions a target set of data (e.g., in virtual database 220) into a plurality of subsets 242 based on a portion of an operating system level attribute 240 in the target set of data. In some implementations, the operating system level attribute includes one or more of a user identifier, a process name, an internet protocol address, a socket number, or a time. In some implementations, at sub-block 512, the block 510 may optionally include tagging each of the plurality of subsets with a respective tag based on a range of a prefix of the operating system level attribute. Accordingly, the processing unit 410 executing the cybersecurity components 425 may provide means for partitioning a target set of data into a plurality of subsets based on a portion of an operating system level attribute in the target set of data.

At block 520, the method 500 may optionally include evaluating whether to query the virtual database with a proposed query and proposed partition size using a model trained to predict a performance metric of the computer. In some implementations, for example, the processing unit 410 executing the cybersecurity components 425 evaluates whether to query the virtual database with a proposed query and proposed partition size using a model trained to predict a performance metric of the computer. Accordingly, the processing unit 410 executing the cybersecurity components 425 may provide means for evaluating whether to query the virtual database with a proposed query and proposed partition size using a model trained to predict a performance metric of the computer.

At block 530, the method 500 may optionally include deploying a script to execute the querying based on the plurality of subsets to one or more other hosts when the model predicts an acceptable performance metric for the one or more other hosts. In some implementations, for example, the processing unit 410 executing the cybersecurity components 425 deploys a script to execute the querying based on the plurality of subsets to one or more other hosts when the model predicts an acceptable performance metric for the one or more other hosts. Accordingly, the processing unit 410 executing the cybersecurity components 425 may provide means for deploying a script to execute the querying based on the plurality of subsets to one or more other hosts when the model predicts an acceptable performance metric for the one or more other hosts.

At block 535, the method 500 may optionally include increasing a quantity of the plurality of subsets in response to the predicted performance metric being unacceptable. In some implementations, for example, the processing unit 410 executing the cybersecurity components 425 increases a quantity of the plurality of subsets in response to the predicted performance metric being unacceptable. For instance, the method 500 may return to block 520 after the block 535 to re-evaluate the query using the increased quantity of the plurality of subsets. Accordingly, the processing unit 410 executing the cybersecurity components 425 may provide means for increasing a quantity of the plurality of subsets in response to the predicted performance metric being unacceptable.

At block 540, the method 500 may optionally include querying a virtual database of the operating system for each of the subsets. In some implementations, for example, the processing unit 410 executing the cybersecurity components 425 (e.g., the query controller 152 queries a virtual database 220 of the operating system 210 for each of the subsets 242. In some implementations, at sub-block 542, the block 540 may optionally include selecting (e.g., SELECT operation 250) rows including the tagged operating system level attribute from two or more tables of the virtual database 220. In some implementations, at sub-block 544, the block 540 may optionally include joining the selected rows in a table (e.g., JOIN operation 260) corresponding to the tag. Accordingly, the processing unit 410 executing the cybersecurity components 425 or query controller 152 may provide means for querying a virtual database of the operating system for each of the subsets.

At block 550, the method 500 includes querying the virtual database for a complement of the plurality of subsets. In some implementations, for example, the processing unit 410 executing the cybersecurity components 425 (e.g., query controller 152) queries the virtual database 220 for a complement (e.g., inversion operation 270) of the plurality of subsets 242. Accordingly, the processing unit 410 executing the cybersecurity components 425 may provide means for querying the virtual database for a complement of the plurality of subsets.

At block 560, the method 500 may optionally include generating a cryptographic fingerprint of one or more query results. In some implementations, for example, the processing unit 410 executing the cybersecurity components 425 (e.g., query controller 152) generates the cryptographic fingerprint of one or more query results. For instance, in some implementations, the cryptographic fingerprint may be a sha256sum. The cryptographic fingerprint may prevent tampering with the query results, for example, by malware attempting to avoid detection. Accordingly, the processing unit 410 executing the cybersecurity components 425 may provide means for generating a cryptographic fingerprint of one or more query results.

At block 570, the method 500 includes outputting aggregated query results to a virtual table or log to a Security Information and Event Management System. In some implementations, for example, the processing unit 410 executing the cybersecurity components 425 outputs aggregated query results to a virtual table or log to a Security Information and Event Management System (i.e., SIEM). In some implementations, the block 570 may optionally include, at sub-block 572, performing a union (e.g., UNION operation 280) on each of the tables corresponding to the tags. For instance, in some implementations, the union may be performed by each host 110 executing a query script provided by the query controller 152. Accordingly, the processing unit 410 executing the cybersecurity components 425 may provide means for outputting aggregated query results to a virtual table or log to a Security Information and Event Management System.

At block 580, the method 500 may optionally include scanning the virtual table or log for a known malware fingerprint or analyzing the virtual table or log to detect a zero-day malware. In some implementations, for example, the processing unit 410 executing the cybersecurity components 425 (e.g., detection component 154 and/or analysis component 156) scans the virtual table or log for a known malware fingerprint or analyzes the virtual table or log to detect a zero-day malware. Accordingly, the processing unit 410 executing the cybersecurity components 425 may provide means for scanning the virtual table or log for a known malware fingerprint or analyzing the virtual table or log to detect a zero-day malware.

Figure 6:
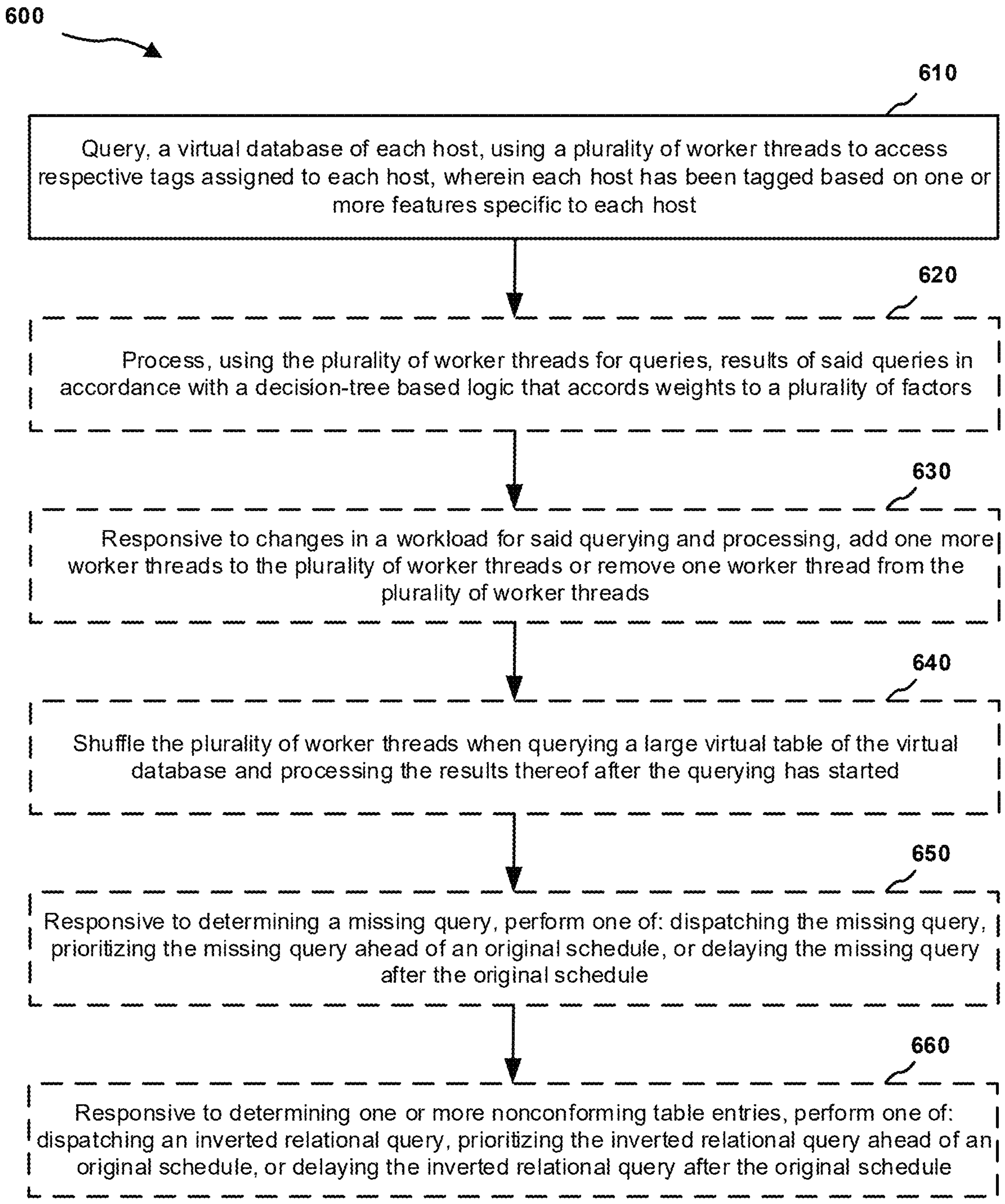
FIG. 6 is a flow diagram that illustrates an example method of detecting bottlenecks in one or more hosts.

FIG. 6 is a flow diagram that illustrates an example method of detecting bottlenecks in one or more hosts. For instance, as noted above, performing queries on a virtual database of a host can consume computing resources and create a bottleneck at the host, which may prevent the host from providing the service 120. The method 600 may be performed by the computing device 400 or one or more components thereof including the processing unit 410 executing the cybersecurity components 425 to detect and/or prevent bottlenecks. In some implementations, the method 600 may be performed as part of or in parallel with the block 540 of the method 500. The method 600 may be performed in communication with one or more computers (e.g., hosts 110) having respective operating systems (e.g., operating system 210). Optional blocks are shown with dashed lines.

At block 610, the method 600 includes querying, a virtual database of each host, using a plurality of worker threads to access respective tags assigned to each host, wherein each host has been tagged based on one or more features specific to each host. In some implementations, for example, the processing unit 410 executing the cybersecurity components 425 (e.g., query controller 152) queries, a virtual database 220 of each host 110, using a plurality of worker threads to access respective tags assigned to each host. In some implementations, each host is initially assigned one or more tags, and wherein each host can have an increased number of tags after initial assignment of the one or more tags. Accordingly, the processing unit 410 executing the cybersecurity components 425 may provide means for querying a virtual database of each host using a plurality of worker threads to access respective tags assigned to each host.

At block 620, the method 600 includes processing, using the plurality of worker threads for queries, results of said queries in accordance with a decision-tree based logic that accords weights to a plurality of factors. In some implementations, for example, the processing unit 410 executing the cybersecurity components 425 (e.g., query controller 152) processes, using the plurality of worker threads for queries, results of said queries in accordance with a decision-tree based logic that accords weights to a plurality of factors. Accordingly, the processing unit 410 executing the cybersecurity components 425 may provide means for processing, using the plurality of worker threads for queries, results of said queries in accordance with a decision-tree based logic that accords weights to a plurality of factors.

At block 630, the method 600 may optionally include, responsive to changes in a workload for said querying and processing, adding one more worker threads to the plurality of worker threads or removing one worker thread from the plurality of worker threads. In some implementations, for example, the processing unit 410 executing the cybersecurity components 425 (e.g., query controller 152) adds one more worker threads to the plurality of worker threads or removes one worker thread from the plurality of worker threads responsive to changes in a workload for said querying and processing. Accordingly, the processing unit 410 executing the cybersecurity components 425 may provide means for adding one more worker thread to the plurality of worker threads or removing one worker thread from the plurality of worker threads.

At block 640, the method 600 may optionally include, shuffling the plurality of worker threads when querying a large virtual table of the virtual database and processing the results thereof after the querying has started. In some implementations, for example, the processing unit 410 executing the cybersecurity components 425 (e.g., query controller 152) shuffles the plurality of worker threads when querying a large virtual table of the virtual database and processing the results thereof after the querying has started. Accordingly, the processing unit 410 executing the cybersecurity components 425 may provide means for shuffling the plurality of worker threads when querying a large virtual table of the virtual database and processing the results thereof after the querying has started.

At block 650, the method 600 may optionally include, responsive to determining a missing query, performing one of: dispatching the missing query, prioritizing the missing query ahead of an original schedule, or delaying the missing query after the original schedule. In some implementations, for example, the processing unit 410 executing the cybersecurity components 425 (e.g., query controller 152) performs one of: dispatching the missing query, prioritizing the missing query ahead of an original schedule, or delaying the missing query after the original schedule responsive to determining a missing query. Accordingly, the processing unit 410 executing the cybersecurity components 425 may provide means for performing one of: dispatching the missing query, prioritizing the missing query ahead of an original schedule, or delaying the missing query after the original schedule.

At block 660, the method 600 may optionally include, responsive to determining one or more nonconforming table entries, performing one of: dispatching an inverted relational query, prioritizing the inverted relational query ahead of an original schedule, or delaying the inverted relational query after the original schedule. In some implementations, for example, the processing unit 410 executing the cybersecurity components 425 (e.g., query controller 152) performs one of: dispatching an inverted relational query, prioritizing the inverted relational query ahead of an original schedule, or delaying the inverted relational query after the original schedule responsive to determining one or more nonconforming table entries. Accordingly, the processing unit 410 executing the cybersecurity components 425 may provide means for performing one of: dispatching an inverted relational query, prioritizing the inverted relational query ahead of an original schedule, or delaying the inverted relational query after the original schedule.

Implementations of the present disclosure can be described in view of the following clauses, the features of which can be combined in any reasonable manner.

Clause 1. A computer-implemented method of investigating an operating system of a computer, comprising: partitioning a target set of data into a plurality of subsets based on a portion of an operating system level attribute in the target set of data; querying a virtual database of the operating system for each of the subsets; querying the virtual database for a complement of the plurality of subsets; and outputting aggregated query results to a virtual table or log.

Clause 2. The computer-implemented method of clause 1, wherein the operating system level attribute includes one or more of a user identifier, a process name, an internet protocol address, a socket number, or a time.

Clause 3. The computer-implemented method of clause 1 or 2, further comprising evaluating whether to query the virtual database with a proposed query and proposed partition size using a model trained to predict a performance metric of the computer.

Clause 4. The computer-implemented method of clause 3, further comprising deploying a script to execute the querying based on the plurality of subsets to one or more other hosts when the model predicts an acceptable performance metric for the one or more other hosts.

Clause 5. The computer-implemented method of clause 3 or 4, further comprising increasing a quantity of the plurality of subsets in response to the predicted performance metric being unacceptable.

Clause 6. The computer-implemented method of any of clauses 1-5, wherein partitioning the target set of data into a plurality of subsets based on a portion of an operating system level attribute in the target set of data comprises tagging each of the plurality of subsets with a respective tag based on a range of a prefix of the operating system level attribute.

Clause 7. The computer-implemented method of clause 6, wherein querying a virtual database of the operating system for each of the subsets comprises: selecting rows including the tagged operating system level attribute from two or more tables of the virtual database; and joining the selected rows in a table corresponding to the tag.

Clause 8. The computer-implemented method of clause 7, wherein outputting aggregated query results to a virtual table or log comprises performing a union on each of the tables corresponding to the tags.

Clause 9. The computer-implemented method of clause 7 or 8, further comprising generating a cryptographic fingerprint of the table corresponding to the tag.

Clause 10. The computer-implemented method of any of clauses 1-9, further comprising: scanning the virtual table or log for a known malware fingerprint; or analyzing the virtual table or log to detect a zero-day malware.

Clause 11. A computer-implemented method to detect bottlenecks in one or more hosts, the computer-implemented method comprising: querying a virtual database of each host, using a plurality of worker threads to access respective tags assigned to each host, wherein each host has been tagged based on one or more features specific to each host; processing, using the plurality of worker threads for queries, results of said queries in accordance with a decision-tree based logic that accords weights to a plurality of factors.

Clause 12. The computer-implemented method of clause 11, wherein each host is initially assigned one or more tags, and wherein each host can have an increased number of tags after initial assignment of the one or more tags.

Clause 13. The computer-implemented method of clause 11 or 12, further comprising: responsive to changes in a workload for said querying and processing, adding one more worker thread to the plurality of worker threads, or removing one worker thread from the plurality of worker threads.

Clause 14. The computer-implemented method of any of clauses 11-13, further comprising: shuffling the plurality of worker threads when querying a large virtual table of the virtual database and processing the results thereof after the querying has started.

Clause 15. The computer-implemented method of any of clauses 11-14, further comprising: responsive to determining a missing query, performing one of: dispatching the missing query, prioritizing the missing query ahead of an original schedule, or delaying the missing query after the original schedule.

Clause 16. The computer-implemented method of any of clauses 11-15, further comprising: responsive to determining one or more nonconforming table entries, performing one of: dispatching an inverted relational query, prioritizing the inverted relational query ahead of an original schedule, or delaying the inverted relational query after the original schedule.

Clause 17. An apparatus for investigating an operating system of a computer comprising a processor and a non-transitory memory with instructions thereon, wherein the instructions upon execution by the processor, cause the processor to: partition a target set of data into a plurality of subsets based on a portion of an operating system level attribute in the target set of data; query a virtual database of the operating system for each of the subsets; query the virtual database for a complement of the plurality of subsets; and output aggregated query results to a virtual table or log.

Clause 18. The apparatus of clause 17, further configured to perform the method of any of clauses 1-16.

Clause 19. A non-transitory computer-readable storage medium storing instructions that cause a processor to: partition a target set of data into a plurality of subsets based on a portion of an operating system level attribute in the target set of data; query a virtual database of the operating system for each of the subsets; query the virtual database for a complement of the plurality of subsets; and output aggregated query results to a virtual table or log.

Clause 20. The non-transitory computer-readable storage medium of clause 19, further comprising instructions that cause the processor to perform the method of any of clauses 1-16.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A computer-implemented method of investigating an operating system of a computer, comprising:

partitioning a target set of data into a plurality of subsets based on a portion of an operating system level attribute in the target set of data;

querying a virtual database of the operating system for each of the subsets;

querying the virtual database for a complement of the plurality of subsets; and outputting aggregated query results to a virtual table or log.

2. The computer-implemented method of claim 1, wherein the operating system level attribute includes one or more of a user identifier, a process name, an internet protocol address, a socket number, or a time.

3. The computer-implemented method of claim 1, further comprising evaluating whether to query the virtual database with a proposed query and proposed partition size using a model trained to predict a performance metric of the computer.

4. The computer-implemented method of claim 3, further comprising deploying a script to execute the querying based on the plurality of subsets to one or more other hosts when the model predicts an acceptable performance metric for the one or more other hosts.

5. The computer-implemented method of claim 3, further comprising increasing a quantity of the plurality of subsets in response to the predicted performance metric being unacceptable.

6. The computer-implemented method of claim 1, wherein partitioning the target set of data into a plurality of subsets based on a portion of an operating system level attribute in the target set of data comprises tagging each of the plurality of subsets with a respective tag based on a range of a prefix of the operating system level attribute.

7. The computer-implemented method of claim 6, wherein querying a virtual database of the operating system for each of the subsets comprises:

selecting rows including the tagged operating system level attribute from two or more tables of the virtual database; and joining the selected rows in a table corresponding to the tag.

8. The computer-implemented method of claim 7, wherein outputting aggregated query results to a virtual table or log comprises performing a union on each of the tables corresponding to the tags.

9. The computer-implemented method of claim 7, further comprising generating a cryptographic fingerprint of the table corresponding to the tag.

10. The computer-implemented method of claim 1, further comprising:

scanning the virtual table or log for a known malware fingerprint; or analyzing the virtual table or log to detect a zero-day malware.

11. A computer-implemented method to detect bottlenecks in one or more hosts, the computer-implemented method comprising:

querying a virtual database of each host, using a plurality of worker threads to access respective tags assigned to each host, wherein each host has been tagged based on one or more features specific to each host;

processing, using the plurality of worker threads for queries, results of said queries in accordance with a decision-tree based logic that accords weights to a plurality of factors.

12. The computer-implemented method of claim 11, wherein each host is initially assigned one or more tags, and wherein each host can have an increased number of tags after initial assignment of the one or more tags.

13. The computer-implemented method of claim 11, further comprising: responsive to changes in a workload for said querying and processing, adding one more worker thread to the plurality of worker threads, or removing one worker thread from the plurality of worker threads.

14. The computer-implemented method of claim 11, further comprising: shuffling the plurality of worker threads when querying a large virtual table of the virtual database and processing the results thereof after the querying has started.

15. The computer-implemented method of claim 11, further comprising: responsive to determining a missing query, performing one of: dispatching the missing query, prioritizing the missing query ahead of an original schedule, or delaying the missing query after the original schedule.

16. The computer-implemented method of claim 11, further comprising: responsive to determining one or more nonconforming table entries, performing one of: dispatching an inverted relational query, prioritizing the inverted relational query ahead of an original schedule, or delaying the inverted relational query after the original schedule.

17. An apparatus for investigating an operating system of a computer comprising a processor and a non-transitory memory with instructions thereon, wherein the instructions upon execution by the processor, cause the processor to:

partition a target set of data into a plurality of subsets based on a portion of an operating system level attribute in the target set of data;

query a virtual database of the operating system for each of the subsets;

query the virtual database for a complement of the plurality of subsets; and output aggregated query results to a virtual table or log.

18. The apparatus of claim 17, wherein the instructions are further configured to cause the processor to evaluate whether to query the virtual database with a proposed query and proposed partition size using a model trained to predict a performance metric of the computer.

19. The apparatus of claim 17, wherein the instructions are further configured to cause the processor to:

query a virtual database of each host, using a plurality of worker threads to access respective tags assigned to each host, wherein each host has been tagged based on one or more features specific to each host;

process, using the plurality of worker threads for queries, results of said queries in accordance with a decision-tree based logic that accords weights to a plurality of factors.

20. A non-transitory computer-readable storage medium storing instructions that cause a processor to:

partition a target set of data into a plurality of subsets based on a portion of an operating system level attribute in the target set of data;

query a virtual database of the operating system for each of the subsets;

query the virtual database for a complement of the plurality of subsets; and output aggregated query results to a virtual table or log.

* * * * *